United States Patent
Norz et al.

(10) Patent No.: US 10,871,763 B2
(45) Date of Patent: Dec. 22, 2020

(54) MANUALLY OPERATED MACHINE TOOL DISPLAY

(71) Applicant: DR. JOHANNES HEIDENHAIN GmbH, Traunreut (DE)

(72) Inventors: Joachim Norz, Trostberg (DE); Judy Swanson, Ashville, NY (US); John Parker, Sugar Grove, PA (US)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 339 days.

(21) Appl. No.: 15/795,287

(22) Filed: Oct. 27, 2017

(65) Prior Publication Data
US 2019/0129379 A1 May 2, 2019

(51) Int. Cl.
*G05B 19/409* (2006.01)
*G06F 3/0484* (2013.01)
*G06F 3/147* (2006.01)

(52) U.S. Cl.
CPC ....... *G05B 19/409* (2013.01); *G06F 3/04845* (2013.01); *G06F 3/147* (2013.01); *G05B 2219/31475* (2013.01); *G05B 2219/34015* (2013.01); *G05B 2219/50138* (2013.01)

(58) Field of Classification Search
CPC ........ G05B 19/409; G05B 2219/31475; G05B 2219/34015; G05B 2219/50138; G06F 3/04845; G06F 3/147
USPC ........................................................ 700/180
See application file for complete search history.

(56) References Cited

U.S. PATENT DOCUMENTS

| 6,449,528 B1 | 9/2002 | Yamato |
| 2005/0221791 A1* | 10/2005 | Angelhag ............ H04B 1/1615 455/343.5 |
| 2015/0020655 A1* | 1/2015 | Len .......................... B23B 5/00 82/104 |
| 2015/0082223 A1 | 3/2015 | Kiyota et al. |

FOREIGN PATENT DOCUMENTS

| EP | 0600174 B1 | 12/1998 |
| WO | WO 2011103550 A1 | 8/2011 |

OTHER PUBLICATIONS

Nishimoto Masashi, "Operation Supporting Device of Working Machine"—Espacenet machine translation, Jul. 7, 2011, Espacenet (Year: 2011).*

* cited by examiner

*Primary Examiner* — Robet E Fennema
*Assistant Examiner* — Christopher W Carter
(74) *Attorney, Agent, or Firm* — Leydig, Voit & Mayer Ltd.

(57) ABSTRACT

A display unit for a manually operated machine tool includes a display having windows and text each associated with and indicating positions of different axes of the manually operated machine tool which are manually adjustable. A memory stores configuration modes of the display including a stationary mode in which the windows and text provided in the display are each the same size and color, and at least one emphasis mode in which the window and/or text associated with one of the different axes is larger and/or a different color. A processor is configured to switch the display from using the stationary mode to using an emphasis mode based a position signal indicating that one of the different axes is being adjusted by manual operation of an operator such that the window and text associated with the axis being adjusted is emphasized on the display.

19 Claims, 5 Drawing Sheets

MANUALLY OPERATED MACHINE TOOL DISPLAY

FIELD

The present invention relates to manually operated machine tools in which one axis is movable at a time for machining a workpiece, and, in particular, to a display for such manually operated machine tools which improves the operability of the manually operated machine tools.

BACKGROUND

European Patent Application No. EP 0 600 174 A1, which is hereby incorporated by reference herein in its entirety, describes a manually operated machine tool having a conventional display unit in which the position of each axis is shown in a separate display window of fixed size.

International Patent Application Publication No. WO 2011/103550, which is hereby incorporated by reference herein in its entirety, describes a customizable digital display used with sensors having different display modes that can be set before-hand by the user.

SUMMARY

In an embodiment, the present invention provides a display unit for a manually operated machine tool. The display unit includes a display having windows and text each associated with and indicating positions of different axes of the manually operated machine tool which are manually adjustable. A memory stores configuration modes of the display including a stationary mode in which the windows and text provided in the display are each the same size and color, and at least one emphasis mode in which at least one of the window and text associated with one of the different axes of the manually operated machine tool is at least one of larger and a different color. A processor has access to the memory and is communicatively connected to position sensors of the different axes of the manually operated machine tool such that position signals indicating the positions of the different axes of the manually operated machine tool are received at the processor. The processor is configured to switch the display from using the stationary mode to using the at least one emphasis mode based on one of the position signals indicating that one of the different axes is being adjusted by manual operation of an operator such that the window and text associated with the axis being adjusted is emphasized on the display.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Manually operated machine tools are designed to produce relative motion between a tool and a workpiece in several dimensions, preferably by the tool and/or the workpiece being movable along X, Y and Z axes. During operation of manually operated machine tools, an operator reads off the position and adjusts the position manually, preferably by hand using a hand wheel. The drives for the different axes may be power fed, but are controlled by manual input and operation.

Embodiments of the present invention improve such manually operated machine tools and the operability thereof by advantageously emphasizing an axis position of an axis which is being moved by the operator of the manually operated machine tool within a display of the manually operated machine tool.

Figure 1:
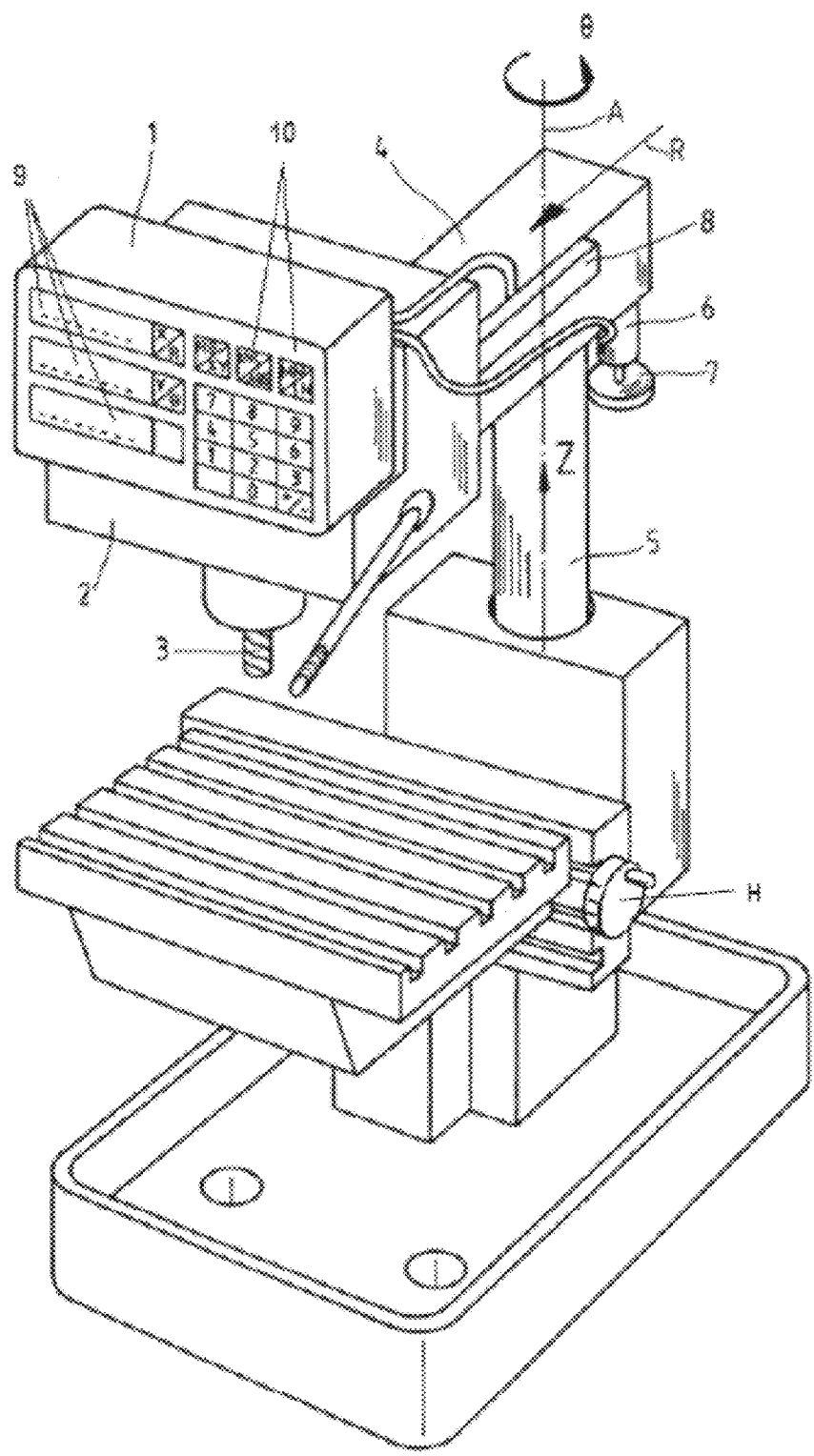
FIG. 1 shows a manually operated machine tool with a conventional display unit.

As shown in FIG. 1, such a manually operated machine tool can be, for example, a manually operated drill, which includes a tool holding part 2 carrying a tool 3. Other examples include manually operated mills, lathes and grinding machines. The tool 3 is movable with respect to a workpiece in three dimensions in that the tool holding part 2 is connected by an arm 4 to a rotatable column 5. The arm 4 is movable linearly in direction R, with the linear position being determined by a linear encoder 8. The arm 4 could likewise move in the Z-direction, with the linear Z-position being determined by another linear encoder. The column 5 rotates the arm 4 and tool holding part 2 about axis A by angle Θ, with the angular position being determined by a rotary encoder 6 using friction wheel 7 which rotates on the column 5. The manually operated machine tool, in particular, the workpiece holder and/or the tool holder, is movable along different axes using one or more hand wheels H for machining the workpiece. In the example shown, the workpiece holder can be moved linearly along one axis by manual operation of hand wheel H. Typically, the different axes will include X, Y and Z axes and there is one hand wheel associated to each axis which can be used to manually control movement along the respective axis. The display unit 1 is fed with the positions from the encoders 6, 8 and displays them as either Polar or Cartesian coordinates in separate displays 9 of fixed size and with a fixed number of digits which can be displayed to indicate the position of the tool 3 with respect to the workpiece. The display unit 1 can include control buttons 10 for inputting information, and/or for accessing machining features, system and job setup settings, etc.

Figure 2:
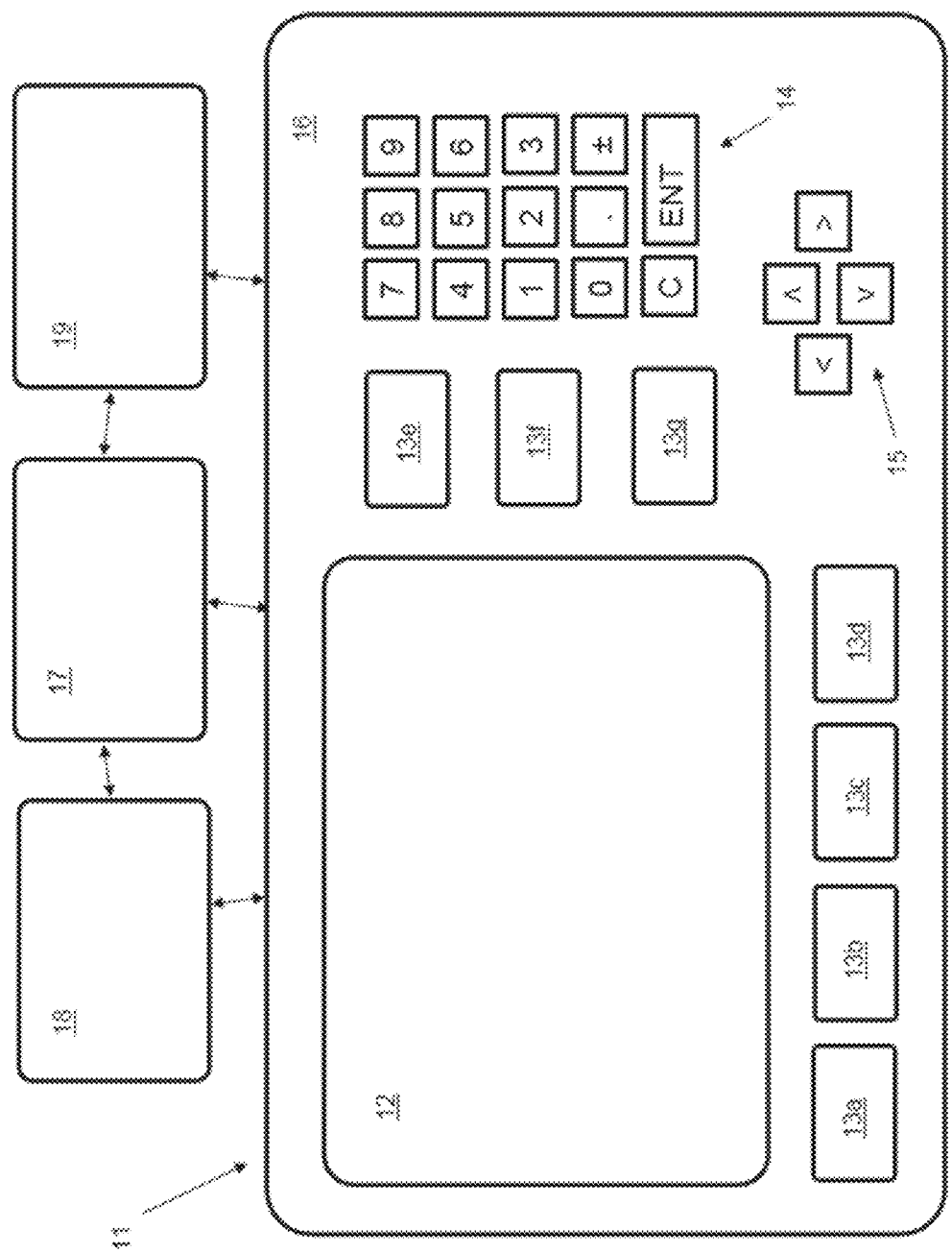
FIG. 2 shows a display unit including a display according to an embodiment of the invention.
Figure 3:
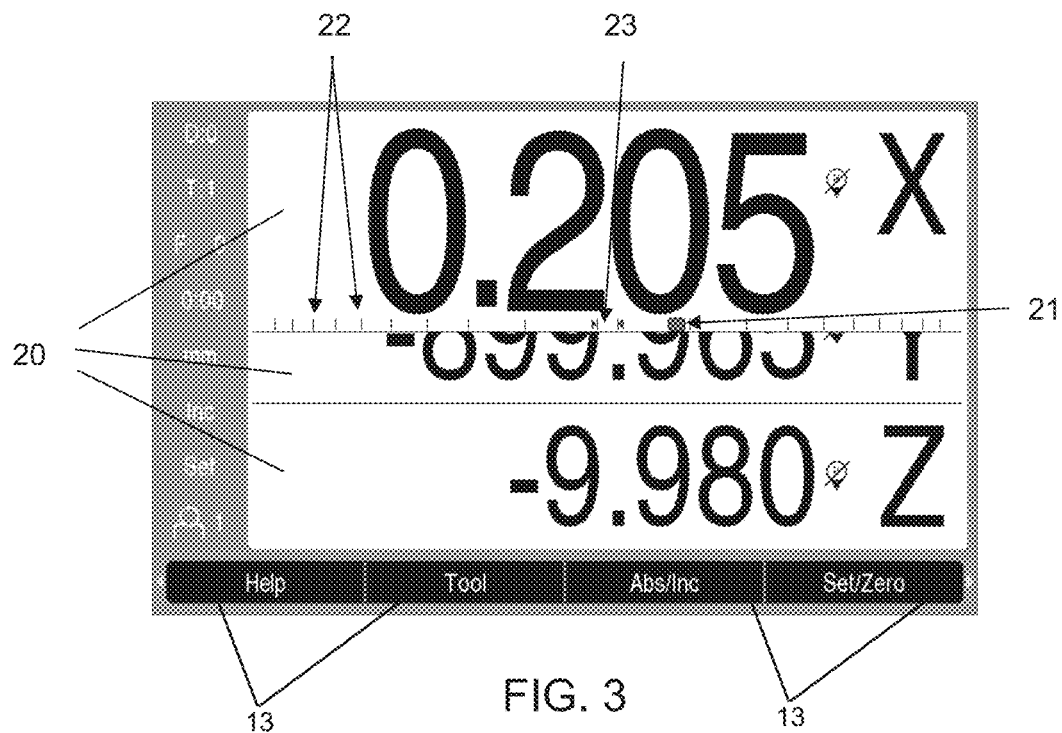
FIG. 3 shows the display in a first enlargement phase.
Figure 4:
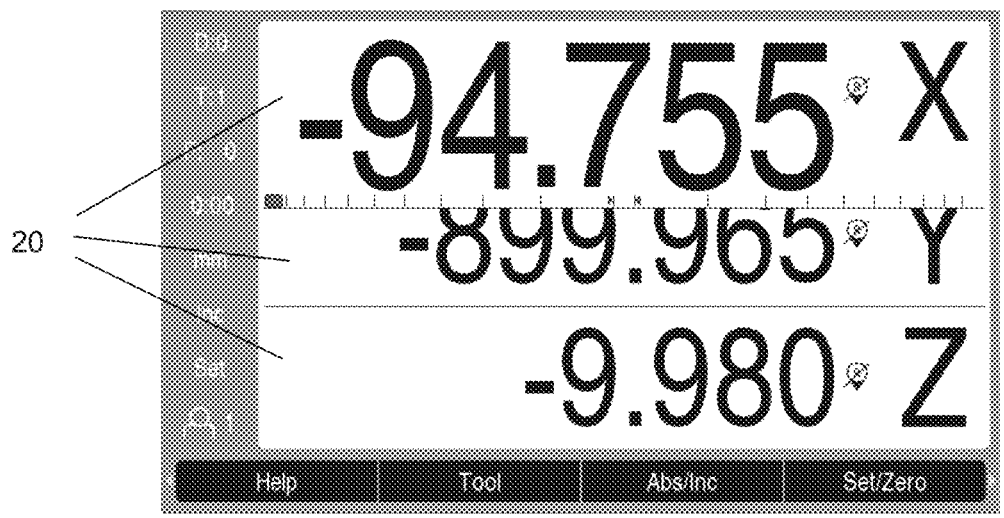
FIG. 4 shows the display in a second enlargement phase.
Figure 5:
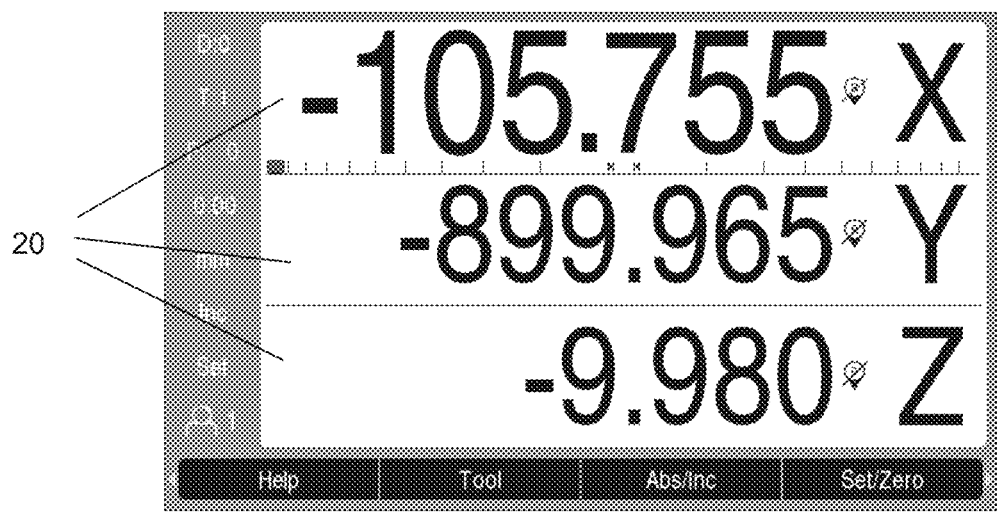
FIG. 5 shows the display in a third enlargement phase.

FIG. 2 shows a display unit 11 according to an embodiment of the present invention. The display unit 11 includes a housing 16 and a display 12. The display 12 is, for example, a liquid crystal display (LCD) or light-emitting diode (LED) display. Preferably, the display 12 is an embedded system with its own processor and software such that the processor 17 of the display unit 11 is an internal processor, but it can also be an external computer or processor communicatively connected with the display unit 11. Likewise, the memory 18 is also preferably internal, but can also be external. The memory 18 stores configuration information for the display which is retrieved and used by the processor 17 to display information received from position sensors 19 which communicate with the processor 17 of the display unit 11.

The position sensors 19 determine the position of each axis of the manually operated machine tool, and indicate the position, with respect to a reference position, by a position signal which is sent to and read by the processor 17. One example of a manually operated machine tool has a workpiece holder that moves linearly along each of the X, Y and Z axes, one at a time, through the operation of respective hand wheels. In this example, the position sensors 19 could be linear encoders which include scanning optics attached to the moving workpiece holder and scales which are stationary with respect to the scanning optics. Position sensors 19 could also be based on magnetic, inductive, capacitive or other measurement principles. In an example where the manually operated machine tool rotates, such as in FIG. 1, both linear and/or rotary encoders can be used as the position sensors 19.

In particular, hand wheels typically move either the tool or workpiece for machining linearly along a particular axis, for example by part of the tool or workpiece holder being attached to another end of a spindle drive. A combination of a lead screw and a clasp nut can transform the rotational movement of the hand wheel into a linear movement of a tool or work piece holder. For convenience, an electric motor can be used to drive the lead screw.

The display unit 11 can optionally include other control buttons 13a-g, a number input pad 14 or navigating controls 15 for navigation in the application software of the display unit 11. For example, buttons 13e-g could be used to set presets to axis values or to zero the axis value and buttons 13a-d could be used to provide access to settings and features. Preferably, however, the display 12 is a touchscreen which accepts inputs by touch or finger gestures, and the control buttons are implemented in the touchscreen. In this case, one side of the display unit 11 can be substantially or entirely covered by the display 12.

Referring to FIGS. 3-7, the display 12 is shown in accordance with embodiments of the invention. In the present invention, the display 12 always includes windows 20 showing the positions of the axes, preferably X, Y and Z axes, of the manually operated machine tool. Optionally, control buttons 13 can be located in the display 12, along with other information. Prior to the present invention, such windows 20 were always of fixed size and displayed text/numbers of a standard size and color. The text in the windows 20 are numbers which show the positions of the respective axes with a specified resolution (for example, to one-thousandths) in mm, inches or other units.

Figure 6:
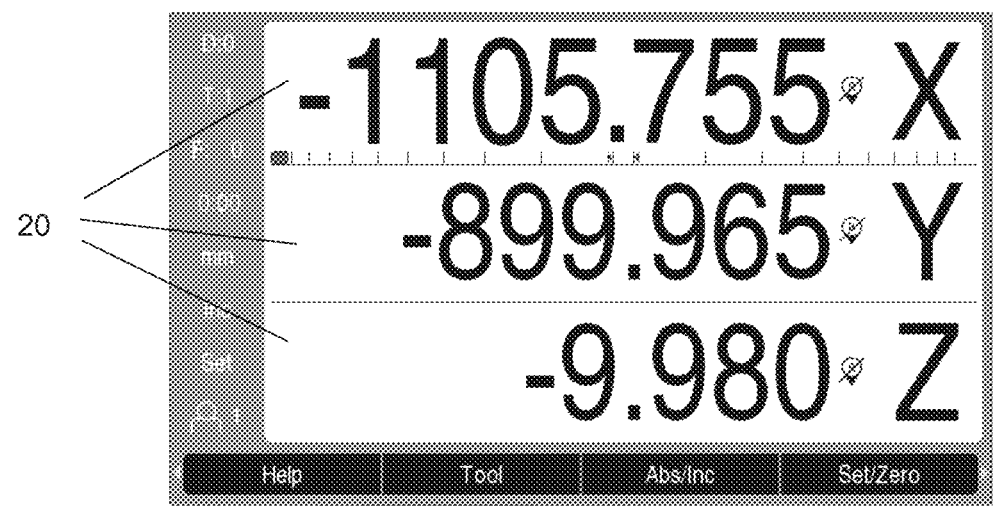
FIG. 6 shows the display in a fourth enlargement phase.

According to an embodiment illustrated in FIGS. 3-6, the display 12 includes four different enlargement modes which depend on the number of digits. At the smallest displacement of the respective axis of the manually operated machine tool with respect to the reference position, there is one digit to the left of the decimal point (FIG. 3), while at the largest displacement of the respective axis of the manually operated machine tool with respect to the reference position, there are four digits to the left of the decimal point (FIG. 6). As more or less digits are required to the left of the decimal point to indicate the actual position of the axis with respect to the reference position, the window 20 associated with that axis decreases or increases in size, respectively. In other embodiments, the number of digits to the right of the decimal points can change or be configured. Accordingly, the different enlargement modes depend on the total number of digits to be displayed.

When the manually operated machine tool is not being operated, the display 12 can use a stationary mode in which each of the windows 20 and text is the same size. Upon the operator moving the hand wheel associated with the X axis of the manually operated machine tool, the position sensor 19 associated with the X axis recognizes the movement and informs the processor 17 continuously about the X axis position via position signals. Upon receiving the position signal indicating that the X axis is being operated, the processor 17 activates a respective enlargement mode from memory 18 to automatically increase the size of the window 20 of the X axis and the text therein with respect to the other windows 20. In the first enlargement mode shown in FIG. 3, the window 20 and text is largest compared to the other enlargement modes of FIGS. 4-6 because the total number of digits is the lowest (in this case, four digits) for the zoom calculation algorithm, and thus the highest factor of magnification is used. As more digits are needed to indicate the position of the X axis, the window 20 and text gradually decrease in size relative to the first enlargement mode to the smallest size shown in the enlargement mode of FIG. 6. However, even in the enlargement mode of FIG. 6, the window 20 and text for the X axis (in this example, the axis being moved by the operator) is still larger and emphasized with respect to the other windows 20 and text. Switching between the enlargement modes is automatic based on the axis position when the number of digits required to indicate that axis position changes (for example, when the X axis position changes from 9.999 to 10.000).

As shown in FIGS. 3-6, the windows 20 and text for the Y and Z axes (in this example, stationary axes not being operated by a hand wheel) can remain the same size and the larger window 20 and text for the X axis can overlap the windows 20 and text for the Y and/or Z axes. Alternatively, the windows 20 and text for the stationary axes Y and Z can be made smaller than in the mode where all axes are stationary and all windows 20 are the same size. In this case the windows 20 and text for the stationary axes Y and Z can be proportionally smaller based on which enlargement mode is being used for the axis which is being adjusted by the operator. In the example shown, the enlarged window 20 for the position of the X axis being moved also includes, at the bottom below the text, dashed lines 22 of different interval spacing and a marker 21 which indicates the distance away from a target point 23 at the center. The marker 21 and dashed lines 22 are more readable to the operator because of the enlarged area of the window 20 for the X axis, while at the same time serve the purposes of further emphasizing and acting as indicating markings on the display for the X axis being moved.

Figure 7:
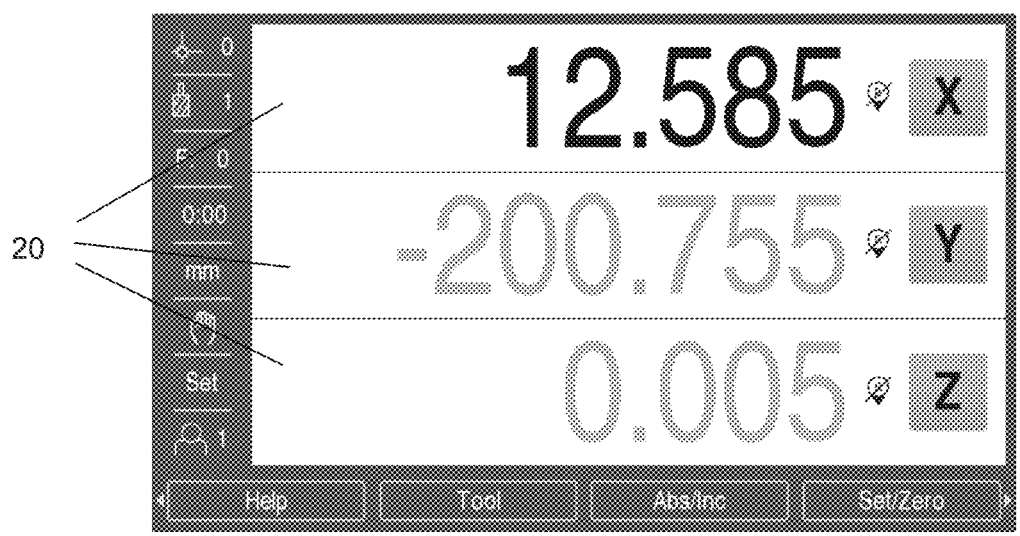
FIG. 7 shows the display in a different emphasis mode.

Alternatively or additionally, the axis which is being moved by the operator can be emphasized with a different color for the text than the other axes which are not being adjusted. For example, as illustrated in FIG. 7, the X axis which is being adjusted by the user can be black while the stationary Y and Z axes can be greyed out. Similarly, the window 20, or region surrounding the text, can be highlighted by having a different color entirely or in parts and/or by having other indicating markings.

In any of the emphasis modes discussed above, once the axes have been stationary for a predetermined period of time, for example, one second, the display 12 returns to the stationary mode in which all windows 20 and text for the axes are the same size.

The inventors have found that emphasizing the axis currently being adjusted or operated by the operator of the manually operated machine tool with respect to the other axes significantly improves the operation and the ergonomics of the manually operated machine tool and provides better machining results and results fewer errors. The operator's attention is immediately drawn to the text indicating the position of the axis being moved according to the embodiments of the invention described herein. Accordingly, it can be immediately recognized which axis is being adjusted such that, if the wrong axis is being adjusted, it can be recognized sooner. Moreover, as the operator continues to operate a hand wheel associated with a respective axis, the operator's focus continues to be drawn to the window 20 and text indicating the position of the axis being moved such that the operator is able to focus on those changing position values while the machining takes place and can even look away from the display 12 and back again without incidentally looking to the position of another one of the stationary axes which may have a similar position value to the axis which is being adjusted. For example, the operator can easily look to the workpiece and back to the display 12 without losing track of the changing position of the axis being moved.

Further, embodiments of the present invention greatly improve the readability of the display 12, especially when the manually operated machine tool is operated in the absolute coordinate system in which the zero point is not of interest. Where the zero point is the target point, the readability is advantageously improved more and more as the operator moves from a larger displacement toward the target point in accordance with the embodiment with different enlargement modes described above. This increase in readability is especially advantageous in allowing the operator to utilize the display 12 from a further distance away and/or when operating larger machines and/or different parts of the manually operated machine tools or related equipment.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A display unit for a manually operated machine tool, the display unit comprising:
   a display including windows and text each associated with and indicating positions of different axes of the manually operated machine tool which are manually adjustable;
   a memory storing configuration modes of the display including a stationary mode in which the windows and text provided in the display are each the same size and color, and at least one emphasis mode in which at least one of the window and text associated with one of the different axes of the manually operated machine tool is at least one of larger and a different color; and
   a processor having access to the memory and being communicatively connected to position sensors of the different axes of the manually operated machine tool such that position signals indicating the positions of the different axes of the manually operated machine tool are received at the processor,
   wherein the processor is configured to switch the display from using the stationary mode to using the at least one emphasis mode based on one of the position signals indicating that the position of one of the different axes is being moved by manual operation of an operator such that the window and text associated with the axis being adjusted is emphasized on the display.

2. The display unit according to claim 1, wherein the at least one emphasis mode includes a plurality of enlargement modes, in each of which the window and text associated with the axis being adjusted is increased with respect to the other windows and text, and wherein the processor is configured to switch between the enlargement modes based on the position signals indicating changes to a number of digits to be shown as the text on the display.

3. The display unit according to claim 2, wherein four enlargement modes are used.

4. The display unit according to claim 2, wherein the enlargement modes further include that the at least one of the window and text associated with the axis being adjusted is a different color.

5. The display unit according to claim 1, wherein the at least one emphasis mode includes a mode in which the at least one of the window and the text associated with the axis being adjusted is a different color.

6. The display unit according to claim 1, wherein the processor is configured to switch the display back to the stationary mode based on the position signals, or a lack thereof, indicating that no axis has been moved for a predetermined period of time.

7. The display unit according to claim 1, wherein the different axes include X, Y and Z axes which are each orthogonal to each other.

8. A manually operated machine tool, comprising:
   a workpiece holder and a tool holder which are movable relative to each other so as to permit machining of a workpiece;
   a hand wheel connected to one of the workpiece holder and the tool holder so as to cause movement of the workpiece holder or the tool holder along a single axis;
   a display including windows and text each associated with and indicating positions of different axes of the manually operated machine tool which are manually adjustable;
   a memory storing configuration modes of the display including a stationary mode in which the windows and text provided in the display are each the same size and color, and at least one emphasis mode in which at least one of the window and text associated with one of the different axes of the manually operated machine tool is at least one of larger and a different color; and a processor having access to the memory and being communicatively connected to position sensors of the different axes of the manually operated machine tool such that position signals indicating the positions of the different axes of the manually operated machine tool are received at the processor, wherein the processor is configured to switch the display from using the stationary mode to using the at least one emphasis mode based on one of the position signals indicating that the position of one of the different axes is being moved by manual operation of an operator such that the window and text associated with the axis being adjusted is emphasized on the display.

9. The manually operated machine tool according to claim 8, wherein the at least one emphasis mode includes a plurality of enlargement modes, in each of which the window and text associated with the axis being adjusted is increased with respect to the other windows and text, and wherein the processor is configured to switch between the enlargement modes based on the position signals indicating changes to a number of digits to be shown as the text on the display.

10. The manually operated machine tool according to claim 9, wherein four enlargement modes are used.

11. The manually operated machine tool according to claim 9, wherein the enlargement modes further include that the at least one of the window and text associated with the axis being adjusted is a different color.

12. The manually operated machine tool according to claim 8, wherein the at least one emphasis mode includes a mode in which the at least one of the window and the text associated with the axis being adjusted is a different color.

13. The manually operated machine tool according to claim 8, wherein the processor is configured to switch the display back to the stationary mode based on the position signals, or a lack thereof, indicating that no axis has been moved for a predetermined period of time.

14. The manually operated machine tool according to claim 8, wherein the different axes include X, Y and Z axes which are each orthogonal to each other.

15. A method for emphasizing, in a display, changing position values of a single axis being moved by manual operation in a manually operated machine tool, the method comprising:

receiving, by a processor, position signals from a position sensor associated with the axis being moved manually, the position signals indicating the changing position values as a result of continued movement of the axis; and based on the position signals, displaying the changing position values in the display along with static position values of other axes of the manually operated machine which are not being moved, the changing position values being emphasized with respect to the static position values.

16. The method according to claim 15, wherein the changing position values are shown at least one of larger and in a different color from the static position values.

17. The method according to claim 15, wherein a window surrounding the changing position values on the display is at least one of larger and in a different color from windows surrounding the static position values on the display.

18. The method according to claim 15, further comprising determining that the axis is no longer being moved and, based thereon, switching a mode of the display such that the position values on the display are no longer emphasized.

19. The method according to claim 15, further comprising moving the axis by rotating a hand wheel of the manually operated machine tool.

* * * * *